3,740,241
SILVER ACTIVATED PHOSPHATE GLASS BATCHED WITH NITRITE

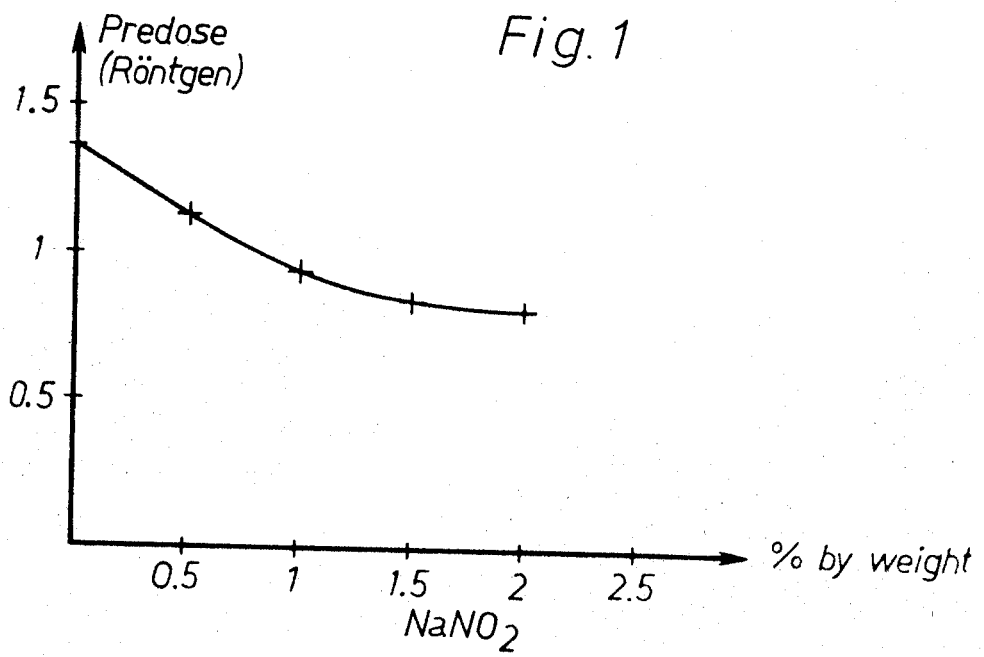
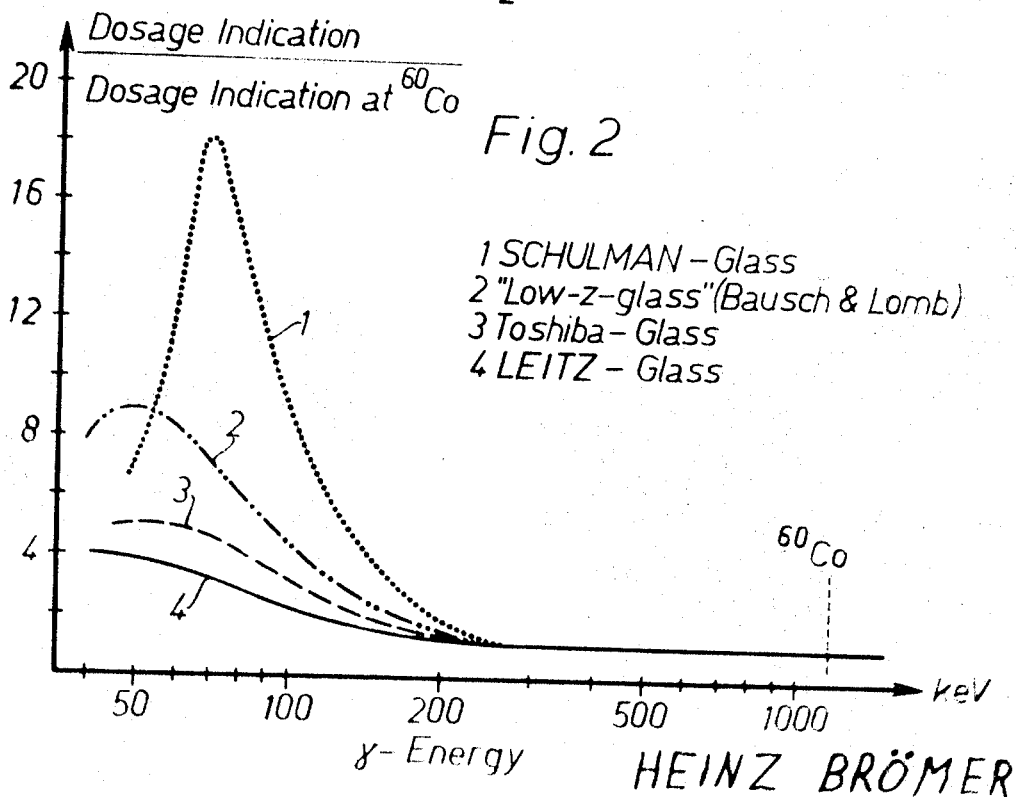

Heinz Brömer, Hermannstein, Kreis Wetzlar, and Norbert Meinert and Hans-Jurgen Preuss, Wetzlar, Germany, assignors to Ernst Leitz, Wetzlar, Germany
Continuation-in-part of abandoned application Ser. No. 701,080, Jan. 29, 1968. This application Dec. 28, 1970, Ser. No. 102,031
Claims priority application Germany, Feb. 9, 1967, L 55,695
Int. Cl. C03c 3/00
U.S. Cl. 106—47 R    9 Claims

ABSTRACT OF THE DISCLOSURE

A silver-activated phosphate glass is disclosed for use as a dosimeter glass having improved weathering resistance. The glass is melted from a batch composition consisting essentially of:

35.4–46.6 percent by weight of lithium metaphosphate;
28.4–44.6 percent by weight of aluminum metaphosphate;
2–8 percent by weight of silver metaphosphate;
7–20 percent by weight of beryllium oxide; and
0.1–2 percent by weight of sodium nitrite wherein the summation of lithium metaphosphate, aluminum metaphosphate and silver metaphosphate is 78.0–88.0 percent by weight.

CROSS-REFERENCE TO RELATED APPLICATIONS

The present application is a continuation-in-part of application Ser. No. 701,080 filed Jan. 29, 1968 and now abandoned.

BACKGROUND OF THE INVENTION

(1) Field of the invention

The invention relates to a silver-activated phosphate glass, which is particularly suitable for use as a gamma dosimeter or a neutron dosimeter.

(2) Description of the prior art

For detecting radioactive radiation, particularly for the detection of gamma radiation, it is well known in the art to use phosphate glasses, which are silver-activated. One glass, for example, is disclosed in U.S. Pat. 2,738,430, which glass consists essentially of 50 percent by weight of aluminum metaphosphate, of 25 percent by weight of barium metaphosphate, and of 25 percent by weight of potassium metaphosphate as the basic glass composition to which up to 16 percent by weight of silver metaphosphate are added.

In an article by Yokota, Nahajima, and Sakai, published in "Health Physics," 1961, vol. 5, pages 219–224, there is disclosed another glass consisting of 50 percent by weight equally of lithium metaphosphate and aluminum metaphosphate. To this basic glass composition are added 3 percent by weight of boron trioxide and 8 percent by weight of silver metaphosphate.

These glasses are of high sensitivity at a very low predosage. It is, however, a disadvantage that the glasses are at the same time very soft and their surfaces have little resistance to weathering conditions. It need not particularly be pointed out that the weather-affected surfaces will influence the measurement results due to the scattering effect of said surfaces.

Efforts have therefore long since been made to improve these glasses that can be used for gamma dosimetry with regard to their weathering resistance. However, these efforts have as yet been without success.

Other glasses for dosimetry are known which contain beryllium oxide. These glasses, as for example, disclosed in the French Pat. No. 1,327,099, consist essentially of 70 percent to 80 percent by weight of phosphorus pentoxide, up to 10 percent by weight of sodium oxide and aluminum oxide, and up to 7.7 percent by weight of lithium oxide. Up to 10 percent of silver oxide is added to the components for activation. However, these glasses are also unsatisfactory as far as their surface resistance is concerned.

The state of the art of dosimeter glass compositions may be ascertained by reference to U.S. Pats. 2,999,819; 3,294,700; 3,449,136 and 3,463,664 issued to Blair, Bedier et al., Carpentier et al. and Yokota et al. respectively.

SUMMARY OF THE INVENTION

It is therefore an object of the invention to provide for dosimetry purposes glasses of greatly improved weathering resistance. This object in attained by melting glasses from a bath composition consisting essentially of:

35.4–46.6 percent by weight of lithium metaphosphate;
28.4–44.6 percent by weight of aluminum metaphosphate;
2–8 percent by weight of silver metaphosphate;
7–20 percent by weight of beryllium oxide;
0.1–2 percent by weight of sodium nitrite; and the summation of lithium metaphosphate, aluminum metaphosphate and silver metaphosphate is 78.0–88.0 percent by weight.

BRIEF DESCRIPTION OF THE DRAWING

FIGS. 1 and 2 appended hereto are graphical representations showing the influence of $NaNO_2$ on the predose of the glass compositions of the present invention and the new and unexpected results of the predose of the present invention over prior art glass compositions.

The critical $NaNO_2$ range of the present invention, 0.1–2 percent by weight contributes essentially to the lowering of the predose. Predose is dependent on the $Ag°$ content. By oxidation, $Ag°$ can be converted into $Ag^+$ and for this purpose, $NaNO_2$ is employed. From FIG. 1 it can clearly be seen that an increase in the $NaNO_2$ content from 0 to the optimum 2 percent by weight results in a lowering of the predose.

In FIG. 2, four different dosimeter glasses are compared with respect to the energy dependence of the dosage indication. It is desirable to make the dosage indication of the dosimeter glass as independent as possible from the $\gamma$-energy radiated into the glass. As can be seen, curve 4 (Leitz glass) shows the lowest dependency on the instantaneously radiated $\gamma$-energy. FIG. 2 also serves as an example for the fact that a good energy dependence (4:1) is produced by means of BeO which is optimized in the Leitz glass.

The glass compositions used in FIG. 2 are as follows:

1. Schulman glass

|  | Percent by weight |
|---|---|
| $Al(PO_3)_3$ | 46.30 |
| $Ba(PO_3)_2$ | 23.15 |
| $KPO_3$ | 23.15 |
| $AgPO_3$ | 7.40 |
| Σ | 100.00 |

NOTE:
Effective atomic number: 28.
Source: Schulman et al: Nucleonics 11, 10 (1953), 52–56; wherein, the dosimeter system of the U.S. Navy is described, which has now been discontinued due to the instability of the glasses.
See also: Nucleonics 17, 9(1959), 955–64.

2. "Low-z-glass" (Bausch & Lomb)

| | Percent by weight | Percent by weight |
|---|---|---|
| $LiPO_3$ | 25 | ≅23.15 |
| $Mg(PO_3)_2$ | 25 | ≅23.15 |
| $Al(PO_3)_3$ | 50 | ≅46.30 |
| $AgPO_3$ | [1] 8 | ≅7.40 |
| Σ | | 100.00 |

[1] Weighed in.
NOTE:
Effective atomic number: 10.2.
Source: Nucleonics 18 (1960), 92.

3 Toshiba glass

| | Percent by weight | Percent by weight |
|---|---|---|
| $Al(PO_3)_3$ | 50 | ≅45.05 |
| $LiPO_3$ | 50 | ≅45.05 |
| $AgPO_3$ | +8 | ≅7.20 |
| $B_2O_3$ | +3 | ≅2.70 |
| Σ | | 100.00 |

NOTE:
Effective Atomic number: 10 2
Source: Health Phys. 9 (1963), 965–72; Source: Health Phys. 5 (1961), 219–24
The data regarding the "effective atomic numbers" stems from: Becker: "Symp Solid State and Chemical Radiation Dosimetry, 3–7.10.1966," 131–146

4. Leitz glass

| | Percent by weight |
|---|---|
| $B_2O_3$ | 3.80 |
| $LiPO_3$ | 45.23 |
| $Al(PO_3)_3$ | 44.60 |
| $AgLi(PO_3)_2$ | 4.37 |
| $NaNO_2$ | 2.00 |
| Σ | 100.00 |

NOTE.—If $AgLi(PO_3)_2$ is separated into its components, then: 4.37 percent by weight $AgLi(PO_3)_2$≅3.00 percent by weight $AgPO_3$+1.37 percent by weight $LiPO_3$.

DESCRIPTION OF THE PREFRRED EMBODIMENTS

Phosphate glasses containing approximately equal amounts of lithium metaphosphate and aluminum metaphosphate as basic ingredients and activated with silver metaphosphate have added to them 7 percent to 20 percent by weight of beryllium oxide for increasing their surface durability. This beryllium oxide may be used in exchange for lithium metaphosphate and/or aluminum metaphosphate. It has been found that between 8 percent and 15 percent by weight of beryllium oxide in particular is the optimum proportion. As can be seen from the following tables, the upper limit for the proportion of beryllium oxide can be attained only when the beryllium oxide is exchanged for aluminum metaphosphate. In any other case—that is to say either when the beryllium oxide is exchanged for lithium metaphosphate alone or when it is exchanged in approximately equal proportions for lithium metaphosphate and aluminum phosphate—an addition of even 20 percent by weight of beryllium oxide results in crystallization.

As it is advantageous for the phosphate glasses here proposed to be melted under oxidizing conditions, 2 percent by weight of sodium nitrite is added to the batch composition in each instance.

An example of a suitable initial glass melt was one of a mixture of

| | Percent by weight |
|---|---|
| $LiPO_3$ | 46.6 |
| $Al(PO_3)_3$ | 44.6 |
| $AgPO_3$ | 3.0 |
| $NaNO_2$ | 2.0 |
| $B_2O_3$ | 3.8 |

This melt composition corresponds to the Leitz glass of FIG. 2. The effective atomic number is approximately 8. The effective atomic number of the stabilized glasses is even lower, since part of the Al and P are exchanged for the lighter atoms of Be and O. The weathering resistance of this glass was tested by the method described under the title "Resistance to Climatic Changes" on Sheet III/3 of Catalogue 3050 of the JENAer Glaswerke Schott & Gen., Mainz, for October 1966. According to the classification of the various glasses given there, the glass referred to above belongs to Class 4, that being the class for the most sensitive glasses. In the following tables, the weathering glass is also given alongside the concentrations.

In the first example in Table 1, the boron trioxide in the initial glass has been replaced by a corresponding percentage weight of beryllium oxide. That, however, is not in itself sufficient to bring about an improvement in surface durability. In the other examples in that table, the proportion of beryllium oxide has been increased at the expense of the lithium metaphosphate. As the table shows, it is only with a proportion of over 6 percent by weight beryllium oxide that there is any striking improvement, and this is reduced once more for further increases in the amount of beryllium oxide.

TABLE 1

| Glass No. | $LiPO_3$ | $Al(PO_3)_3$ | $AgPO_3$ | $NaNO_2$ | BeO | Weathering | Σ: $LiPO_3$ $Al(PO_3)_3$ AgPO |
|---|---|---|---|---|---|---|---|
| 1 | 46.60 | 44.60 | 3.00 | 2.00 | 3.80 | 4 | |
| 2 | 44.40 | 44.60 | 3.00 | 2.00 | 6.00 | 4 | |
| 3 | 40.40 | 44.60 | 3.00 | 2.00 | 10.00 | 2 | 88.00 |
| 4 | 35.40 | 44.60 | 3.00 | 2.00 | 15.00 | 3 | 83.00 |
| 5 | 30.40 | 44.60 | 3.00 | 2.00 | 20.00 | Crystallized | |

In the examples given in Table 2, the proportion of beryllium oxide has been increased at the expense of the aluminum metaphosphate. As already stated above, the proportion of beryllium oxide can be raised in that case to 20 percent by weight, without devitrification resulting. In these examples again, there is initially an improvement in surface durability as the proportion of beryllium oxide is increased, but durability worsens again when 15 percent by weight is exceeded.

TABLE 2

| Glass No. | $LiPO_3$ | $Al(PO_3)_3$ | $AgPO_3$ | $NaNO_2$ | BeO | Weathering | Σ: $LiPO_3$ $Al(PO_3)_3$ AgPO |
|---|---|---|---|---|---|---|---|
| 6 | 46.60 | 42.40 | 3.00 | 2.00 | 6.00 | 4 | |
| 7 | 46.60 | 38.40 | 3.00 | 2.00 | 10.00 | 3 | 88.00 |
| 8 | 46.60 | 33.40 | 3.00 | 2.00 | 15.00 | 2 | 83.00 |
| 9 | 46.60 | 28.40 | 3.00 | 2.00 | 20.00 | 2–3 | 78.00 |

Finally, in Table 3, the proportion of beryllium oxide has been increased, the proportions of lithium metaphosphate and aluminum metaphosphate being reduced at the same time. In these examples likewise, the same trend is evident as regards surface durability. In these examples, however, in which the proportion of lithium metaphosphate is reduced, the upper limit of 20 percent by weight of beryllium oxide can no longer be reached without devitrification occurring.

TABLE 3

| Glass No. | $LiPO_3$ | $Al(PO_3)_3$ | $AgPO_3$ | $NaNO_2$ | BeO | Weathering | $\Sigma: LiPO_3, Al(PO_3)_3, AgPO_3$ |
|---|---|---|---|---|---|---|---|
| 10 | 45.50 | 43.50 | 3.00 | 2.00 | 6.00 | 4 | |
| 11 | 43.50 | 41.50 | 3.00 | 2.00 | 10.00 | 2 | 88.00 |
| 12 | 41.00 | 39.00 | 3.00 | 2.00 | 15.00 | 2-3 | 83.00 |
| 13 | 38.50 | 36.50 | 3.00 | 2.00 | 20.00 | Crystallized | |

It has been found that, when beryllium oxide is added, the dissolving power for silver ions is not reduced. The dosimeter properties (pre-dosage and sensitivity) of these glasses is maintained when care is taken to insure that the beryllium oxide is added in extremely pure form. In particular, the beryllium oxide must be free from iron impurities.

In Tables 1–3, it is demonstrated how an increase in BeO, with a corresponding reduction of $LiPO_3$ (Table 1) or $Al(PO_3)_3$ (Table 2) or $LiPO_3$ and $Al(PO_3)_3$ (Table 3) leads to a successive improvement of weathering resistance.

It is noted that:

The optimum of weatherability (class 2) is obtained (in Table 1) with constant contents of $Al(PO_3)_3$, $AgPO_3$, and $NaNO_2$ with decreasing $LiPO_3$ content (46.6→40.4 percent by weight) and a simultaneous, weight-equivalent increase in BeO (3.8→10.0 percent by weight):

The optimum of weatherability (class 2) is obtained (in Table 2) with constant contents of $LiPO_3$, $AgPO_3$, and $NaNO_2$ with decreasing $Al(PO_3)_3$ content (42.4→28.4 percent by weight) and a simultaneous, weight-equivalent increase in BeO (6.0→15.0 percent by weight);

The optimum of weatherability (class 2) is obtained (in Table 3) with constant contents of $AgPO_3$ and $NaNO_2$ with decreasing contents of $LiPO_3$ (45.5→38.5 percent by weight) and $Al(PO_3)_3$ (43.5→36.5 percent by weight) and a simultaneous, weight-equivalent increase in BeO (6.0→10.0 percent by weight).

In Table 4, which follows, the effect of $NaNO_2$ on four different melts is shown. The components of the melts are shown in percent by weight. The components not in parentheses show the starting point for the melt experiments plus (+) the addition of the percent by weight of $NaNO_2$. The components in parentheses show the values reduced to percent by weight with the inclusion of the $NaNO_2$. The numerical data for the predose and the sensitivity are average values from six individual measurements.

What is claimed is:

1. A silver-activated phosphate glass having improved weathering resistance for use as a dosimeter glass and further characterized by a relatively low predose melted from a batch composition consisting essentially of:
   35.4–46.6 percent by weight of lithium metaphosphate;
   28.4–44.6 percent by weight of aluminum metaphosphate;
   2–8 percent by weight of silver metaphosphate;
   7–20 percent by weight of beryllium oxide; and
   0.1–2 percent by weight of sodium nitrite; wherein the summation of said lithium metaphosphate, said aluminum metaphosphate and said silver metaphosphate is 78.0–88.0 percent by weight.

2. A glass composition according to claim 1, wherein the proportion of beryllium oxide in the batch composition is between 8–15 percent by weight.

3. A glass composition according to claim 1, wherein said lithium metaphosphate is 40.4 percent by weight, said aluminum metaphosphate is 44.6 percent by weight, and said silver metaphosphate is 3.0 percent by weight.

4. A glass composition according to claim 1, wherein said lithium metaphosphate is 35.4 percent by weight, said aluminum metaphosphate is 44.6 percent by weight, and said silver metaphosphate is 3.0 percent by weight.

5. A glass composition according to claim 1, wherein said lithium metaphosphate is 46.6 percent by weight, said aluminum metaphosphate is 38.4 percent by weight, and said silver metaphosphate is 3.0 percent by weight.

6. A glass composition according to claim 1, wherein said lithium metaphosphate is 46.6 percent by weight, said aluminum metaphosphate is 33.4 percent by weight, and said silver metaphosphate is 3.0 percent by weight.

7. A glass composition according to claim 1, wherein said lithium metaphosphate is 46.6 percent by weight, said aluminum metaphosphate is 28.4 percent by weight, and said silver metaphosphate is 3.0 percent by weight.

8. A glass composition according to claim 1, wherein said lithium metaphosphate is 43.5 percent by weight, said aluminum metaphosphate is 41.5 percent by weight, and said silver metaphosphate is 3.0 percent by weight.

9. A glass composition according to claim 1, wherein said lithium metaphosphate is 41.0 percent by weight, said aluminum metaphosphate is 39.0 percent by weight, and said silver metaphosphate is 3.0 percent by weight.

TABLE 4

| Melt No. | $SiO_2$ | $B_2O_3$ | $LiPO_3$ | $Al(PO_3)_3$ | $AgPO_3$ | $NaNO_2$ | Predose | Sensitivity |
|---|---|---|---|---|---|---|---|---|
| A | 3.00 (3.00) | 3.80 (3.80) | 43.60 (46.54) | 43.60 (43.56) | 3.00 (3.00) | +0.10 (0.10) | 0.56 | 0.96 |
| B | 3.00 (2.98) | 3.80 (3.78) | 43.60 (43.38) | 43.60 (43.38) | 3.00 (2.98) | +0.50 (0.50) | 0.51 | 0.98 |
| C | 3.00 (2.97) | 3.80 (3.76) | 43.60 (46.13) | 43.60 (43.18) | 3.00 (2.97) | +1.00 (0.99) | 0.50 | 1.03 |
| D | 3.00 (2.94) | 3.80 (3.72) | 43.60 (45.69) | 43.60 (42.75) | 3.00 (2.94) | +2.00 (1.96) | 0.41 | 1.04 |

References Cited

UNITED STATES PATENTS

| 3,294,700 | 12/1966 | Bedier et al. | 252—301.1 |
| 3,449,136 | 6/1969 | Carpentier et al. | 106—47 R |
| 3,463,664 | 8/1969 | Yokota et al. | 106—47 R |
| 2,999,819 | 9/1961 | Blair | 252—408 |

OTHER REFERENCES

Volf, M. B., Technical Glasses, London, 1961, pp. 98, 142, 411.

JAMES E. POER, Primary Examiner

W. R. SATTERFIELD, Assistant Examiner

U.S. Cl. X.R.

250—83 R; 252—301.4, 408